(12) United States Patent
Rhoads (10) Patent No.: US 7,499,566 B2
(45) Date of Patent: Mar. 3, 2009

(54) METHODS FOR STEGANOGRAPHIC ENCODING MEDIA

(75) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 546 days.

(21) Appl. No.: 11/187,783

(22) Filed: Jul. 22, 2005

(65) Prior Publication Data

US 2005/0254684 A1    Nov. 17, 2005

Related U.S. Application Data

(60) Continuation of application No. 10/208,735, filed on Jul. 29, 2002, now Pat. No. 6,922,480, which is a continuation of application No. 09/293,601, filed on Apr. 15, 1999, now Pat. No. 6,427,020, which is a division of application No. 09/074,034, filed on May 6, 1998, now Pat. No. 6,449,377, which is a continuation-in-part of application No. 08/438,159, filed on May 8, 1995, now Pat. No. 5,850,481, said application No. 09/293,601 is a continuation-in-part of application No. 09/234,780, filed on Jan. 20, 1999, now abandoned.

(60) Provisional application No. 60/082,228, filed on Apr. 16, 1998, provisional application No. 60/071,983, filed on Jan. 20, 1998.

(51) Int. Cl.
*H04K 1/00* (2006.01)

(52) U.S. Cl. .......................... 382/100; 705/51
(58) Field of Classification Search ................. 382/100, 382/232; 713/176; 380/201, 202, 203; 705/51, 705/57, 58
See application file for complete search history.

(56) References Cited

U.S. PATENT DOCUMENTS

| | | | |
|---|---|---|---|
| 2,573,279 A | 10/1951 | Scherbatskoy | 346/37 |
| 2,766,374 A | 10/1956 | Hoffmann | 250/2 |
| 3,492,577 A | 1/1970 | Reiter et al. | 325/31 |
| 3,586,781 A | 6/1971 | Jones | 179/15 |
| 3,684,838 A | 8/1972 | Kahn | 179/15.55 R |
| 3,696,298 A | 10/1972 | Kahn et al. | 325/59 |
| 3,735,048 A | 5/1973 | Tomsa et al. | 179/15 BM |
| 3,760,275 A | 9/1973 | Ohsawa et al. | 325/31 |
| 3,885,217 A | 5/1975 | Clintron | 325/26 |
| 4,025,851 A | 5/1977 | Haselwood et al. | 325/31 |
| 4,134,127 A | 1/1979 | Campioni | 358/16 |
| 4,218,738 A | 8/1980 | Matyas et al. | 364/200 |
| 4,230,990 A | 10/1980 | Lert, Jr. et al. | 455/67 |
| 4,238,849 A | 12/1980 | Gassmann | 370/11 |
| 4,245,346 A | 1/1981 | Grady et al. | 455/28 |
| 4,313,197 A | 1/1982 | Maxemchuck | 370/111 |
| 4,379,947 A | 4/1983 | Warner | 179/1 GD |
| 4,389,671 A | 6/1983 | Posner et al. | 358/124 |
| 4,395,600 A | 7/1983 | Lundy et al. | 179/1.5 M |
| 4,425,642 A | 1/1984 | Moses et al. | 370/76 |
| 4,425,661 A | 1/1984 | Moses et al. | 375/1 |
| 4,512,013 A | 4/1985 | Nash et al. | 370/69.1 |
| 4,523,311 A | 6/1985 | Lee et al. | 370/69.1 |
| 4,528,588 A | 7/1985 | Löfberg | 358/122 |
| 4,528,643 A | 7/1985 | Freeny, Jr. | 364/900 |
| 4,581,746 A | 4/1986 | Arnold | 375/5 |
| 4,618,890 A | 10/1986 | Kouyama et al. | 358/149 |
| 4,652,915 A | 3/1987 | Heller, III | 358/84 |
| 4,677,435 A | 6/1987 | Causse D'Agraives et al. | 340/825.31 |
| 4,677,466 A | 6/1987 | Lert, Jr. et al. | 358/84 |
| 4,688,255 A | 8/1987 | Kahn | 381/16 |
| 4,750,053 A | 6/1988 | Allen | 358/335 |
| 4,771,455 A | 9/1988 | Hareyama et al. | 380/6 |
| 4,782,523 A | 11/1988 | Galand et al. | 379/386 |
| 4,807,031 A | 2/1989 | Broughton et al. | 358/142 |
| 4,827,508 A | 5/1989 | Shear | 380/4 |
| 4,888,798 A | 12/1989 | Earnest | 380/4 |
| 4,931,871 A | 6/1990 | Kramer | 358/142 |
| 4,939,515 A | 7/1990 | Adelson | 341/51 |
| 4,941,175 A | 7/1990 | Enescu et al. | 380/4 |
| 4,943,973 A | 7/1990 | Werner | 375/1 |
| 4,945,412 A | 7/1990 | Kramer | 358/142 |
| 4,956,709 A | 9/1990 | Richer et al. | 358/147 |
| 4,977,594 A | 12/1990 | Shear | 380/4 |
| 4,999,806 A | 3/1991 | Chernow et al. | 364/900 |
| 5,023,907 A | 6/1991 | Johnson et al. | 380/4 |
| 5,025,443 A | 6/1991 | Gupta | 370/76 |
| 5,050,213 A | 9/1991 | Shear | 380/25 |
| 5,079,647 A | 1/1992 | Nenezu et al. | 360/27 |
| 5,103,476 A | 4/1992 | Waite et al. | 380/4 |
| 5,113,518 A | 5/1992 | Durst, Jr. et al. | 395/550 |
| 5,138,712 A | 8/1992 | Corbin | 395/700 |
| 5,182,770 A | 1/1993 | Medveczky et al. | 380/4 |
| 5,227,874 A | 7/1993 | Van Kohorn | 358/84 |
| 5,243,423 A | 9/1993 | DeJean et al. | 358/142 |
| 5,285,498 A | 2/1994 | Johnston | 381/2 |
| 5,315,098 A | 5/1994 | Tow | 235/494 |

(Continued)

FOREIGN PATENT DOCUMENTS

DE    2943436 A1    5/1981

(Continued)

OTHER PUBLICATIONS

Koch et al., "Copyright Protection for Multimedia Data," Proc. Int. Conf. on Digital Media and Electronic Publishing, Dec. 1994.*

(Continued)

*Primary Examiner*—Andrew W Johns (57) ABSTRACT

The present invention relates to digital watermarking and steganographic embedding. In one implementation a method is provided to help associate usage rights with media. The usage rights are used by a rights management system to control how the media is handled by the system. In response to the associating, an identifier is provided and embedded in the media in a steganographic manner.

21 Claims, 3 Drawing Sheets

U.S. PATENT DOCUMENTS

| | | | |
|---|---|---|---|
| 5,319,705 A | 6/1994 | Halter et al. ............... 380/4 |
| 5,319,735 A | 6/1994 | Preuss et al. ............ 395/2.14 |
| 5,321,841 A | 6/1994 | East et al. ................ 395/725 |
| 5,349,549 A | 9/1994 | Tsutsui ..................... 364/725 |
| 5,351,302 A | 9/1994 | Leighton et al. ............ 380/30 |
| 5,355,161 A | 10/1994 | Bird et al. ..................... 348/2 |
| 5,374,976 A | 12/1994 | Spannenburg ............ 355/201 |
| 5,394,274 A | 2/1995 | Kahn ........................... 360/27 |
| 5,404,377 A | 4/1995 | Moses ....................... 375/200 |
| 5,410,541 A | 4/1995 | Hotto .......................... 370/76 |
| 5,410,598 A | 4/1995 | Shear ............................ 380/4 |
| 5,428,731 A | 6/1995 | Powers, III ................ 395/154 |
| 5,450,490 A | 9/1995 | Jensen et al. .................. 380/6 |
| 5,457,807 A | 10/1995 | Weinblatt ..................... 455/2 |
| 5,463,423 A | 10/1995 | Tults ......................... 348/465 |
| 5,464,997 A | 11/1995 | Watanabe ................. 257/239 |
| 5,473,692 A | 12/1995 | Davis ........................... 380/25 |
| 5,481,294 A | 1/1996 | Thomas et al. ................ 348/1 |
| 5,481,370 A | 1/1996 | Kim ............................ 358/341 |
| 5,495,411 A | 2/1996 | Ananda ...................... 364/401 |
| 5,519,778 A | 5/1996 | Leighton et al. ............ 380/30 |
| 5,534,941 A | 7/1996 | Sie et al. .................... 348/564 |
| 5,535,300 A | 7/1996 | Hall, II et al. ........... 395/2.36 |
| 5,548,645 A | 8/1996 | Ananda ......................... 380/4 |
| 5,550,593 A | 8/1996 | Nakabayashi ............. 348/465 |
| 5,553,143 A | 9/1996 | Ross et al. ................... 380/25 |
| 5,574,962 A | 11/1996 | Fardeau et al. ................ 455/2 |
| 5,574,963 A | 11/1996 | Weinblatt et al. ............. 455/2 |
| 5,579,479 A | 11/1996 | Plum ...................... 395/188.01 |
| 5,583,784 A | 12/1996 | Kapust et al. ............. 364/484 |
| 5,583,962 A | 12/1996 | Davis et al. .............. 395/2.38 |
| 5,584,050 A | 12/1996 | Lyons ....................... 455/67.1 |
| 5,594,934 A | 1/1997 | Lu et al. ......................... 455/2 |
| 5,606,609 A | 2/1997 | Houser et al. ................. 380/4 |
| 5,613,004 A | 3/1997 | Cooperman et al. ......... 380/28 |
| 5,617,119 A | 4/1997 | Briggs et al. .............. 345/611 |
| 5,629,739 A | 5/1997 | Dougherty ................ 348/486 |
| 5,629,980 A | 5/1997 | Stefik et al. ................... 380/4 |
| 5,630,011 A | 5/1997 | Lim et al. ................. 395/2.14 |
| 5,630,203 A | 5/1997 | Weinblatt ..................... 455/2 |
| 5,634,012 A | 5/1997 | Stefik et al. .............. 395/239 |
| 5,636,276 A | 6/1997 | Brugger ........................ 380/4 |
| 5,638,443 A | 6/1997 | Stefik et al. ................... 380/4 |
| 5,646,997 A | 7/1997 | Barton ......................... 380/23 |
| 5,646,999 A | 7/1997 | Saito ............................. 380/25 |
| 5,652,626 A | 7/1997 | Kawakami et al. .......... 348/463 |
| 5,652,714 A | 7/1997 | Peterson et al. ........... 364/550 |
| 5,657,462 A | 8/1997 | Brouwer et al. ........... 395/336 |
| 5,668,805 A | 9/1997 | Yoshinobu ................. 370/335 |
| 5,675,388 A | 10/1997 | Cooper ...................... 348/461 |
| 5,689,822 A | 11/1997 | Zucker .......................... 455/89 |
| 5,699,124 A | 12/1997 | Nuber et al. .............. 348/465 |
| 5,699,526 A | 12/1997 | Siefert ....................... 395/227 |
| 5,703,877 A | 12/1997 | Nuber et al. .............. 370/395 |
| 5,715,403 A | 2/1998 | Stefik ........................ 395/244 |
| 5,719,937 A | 2/1998 | Warren et al. ................. 380/4 |
| 5,734,119 A | 3/1998 | France et al. ................. 84/622 |
| 5,734,719 A | 3/1998 | Tsevdos et al. ............... 380/5 |
| 5,745,569 A | 4/1998 | Moskowitz et al. ........... 380/4 |
| 5,748,763 A | 5/1998 | Rhoads ...................... 382/115 |
| 5,748,956 A | 5/1998 | Lafer et al. ................ 395/956 |
| 5,754,661 A | 5/1998 | Weinfurtner ............. 381/68.2 |
| 5,765,152 A | 6/1998 | Erickson ....................... 707/9 |
| 5,765,176 A | 6/1998 | Bloomberg ................ 707/514 |
| 5,768,426 A | 6/1998 | Rhoads ...................... 382/232 |
| 5,768,680 A | 6/1998 | Thomas ......................... 455/2 |
| 5,801,687 A | 9/1998 | Peterson et al. ........... 345/302 |
| 5,808,689 A | 9/1998 | Small ......................... 348/476 |
| 5,809,160 A | 9/1998 | Powell et al. .............. 382/100 |
| 5,822,432 A | 10/1998 | Moskowitz et al. ......... 380/28 |
| 5,828,485 A | 10/1998 | Hewlett ..................... 359/291 |
| 5,832,119 A | 11/1998 | Rhoads ...................... 382/232 |
| 5,845,281 A | 12/1998 | Benson ........................... 707/9 |
| 5,848,424 A | 12/1998 | Scheinkman et al. ........ 707/501 |
| 5,852,673 A | 12/1998 | Young ....................... 382/164 |
| 5,862,260 A | 1/1999 | Rhoads ...................... 382/232 |
| 5,870,405 A | 2/1999 | Hardwick et al. ............ 371/2.1 |
| 5,875,249 A | 2/1999 | Mintzer et al. ............... 380/54 |
| 5,915,019 A | 6/1999 | Ginter et al. ................... 380/4 |
| 5,917,912 A | 6/1999 | Ginter et al. ................. 380/24 |
| 5,920,861 A | 7/1999 | Hall et al. ...................... 707/9 |
| 5,920,878 A | 7/1999 | DeMont .................... 707/513 |
| 5,926,822 A | 7/1999 | Garman ..................... 707/503 |
| 5,940,504 A | 8/1999 | Griswold ...................... 380/4 |
| 5,943,422 A | 8/1999 | Van Wie et al. ............... 380/9 |
| 5,974,141 A | 10/1999 | Saito .............................. 380/4 |
| 5,982,956 A | 11/1999 | Lahmi ....................... 382/306 |
| 5,983,218 A | 11/1999 | Syeda-Mahmood ........... 707/3 |
| 5,991,500 A | 11/1999 | Kanota et al. ................ 386/94 |
| 5,991,876 A | 11/1999 | Johnson et al. ............ 713/200 |
| 5,995,625 A | 11/1999 | Sudia et al. .................. 380/25 |
| 6,035,177 A | 3/2000 | Moses et al. .................. 455/2 |
| 6,141,753 A | 10/2000 | Zhao et al. ................. 713/176 |
| 6,151,578 A | 11/2000 | Bourcet et al. ............ 704/500 |
| 6,182,218 B1 | 1/2001 | Saito .......................... 713/176 |
| 6,185,683 B1 | 2/2001 | Ginter et al. ............... 713/176 |
| 6,226,618 B1 | 5/2001 | Downs et al. ................. 705/1 |
| 6,229,924 B1 | 5/2001 | Rhoads et al. .............. 382/232 |
| 6,233,684 B1 | 5/2001 | Stefik et al. ................ 713/176 |
| 6,236,971 B1 | 5/2001 | Stefik et al. .................... 705/1 |
| 6,266,430 B1 | 7/2001 | Rhoads ...................... 382/100 |
| 6,272,176 B1 | 8/2001 | Srinivasan ................. 375/240 |
| 6,330,335 B1 | 12/2001 | Rhoads ...................... 380/252 |
| 6,353,672 B1 | 3/2002 | Rhoads ...................... 382/100 |
| 6,363,159 B1 | 3/2002 | Rhoads ...................... 382/100 |
| 5,636,292 C1 | 6/2002 | Rhoads ...................... 382/232 |
| 6,398,245 B1 | 6/2002 | Gruse et al. ................ 280/228 |
| 6,433,946 B2 | 8/2002 | Ogino ........................... 360/60 |
| 6,442,285 B2 | 8/2002 | Rhoads et al. .............. 382/100 |
| 6,449,367 B2 | 9/2002 | Van Wie et al. ............ 380/232 |
| 6,449,379 B1 | 9/2002 | Rhoads ...................... 382/100 |
| 6,505,160 B1 | 1/2003 | Levy et al. ................. 704/270 |
| 6,519,352 B2 | 2/2003 | Rhoads ...................... 382/100 |
| 6,539,095 B1 | 3/2003 | Rhoads ...................... 381/73.1 |
| 6,542,620 B1 | 4/2003 | Rhoads ...................... 382/100 |
| 6,587,821 B1 | 7/2003 | Rhoads ...................... 704/270 |
| 6,590,997 B2 | 7/2003 | Rhoads ...................... 382/100 |
| 6,654,480 B2 | 11/2003 | Rhoads ...................... 382/100 |
| 6,675,146 B2 | 1/2004 | Rhoads ...................... 704/270 |
| 6,694,041 B1 | 2/2004 | Brunk ........................ 382/100 |
| 6,754,377 B2 | 6/2004 | Rhoads ...................... 382/135 |
| 6,768,808 B2 | 7/2004 | Rhoads ...................... 382/100 |
| 6,778,682 B2 | 8/2004 | Rhoads ...................... 382/100 |
| 6,807,534 B1 | 10/2004 | Erickson ....................... 705/51 |
| 6,816,596 B1 | 11/2004 | Peinado et al. ............. 380/277 |
| 6,829,368 B2 | 12/2004 | Meyer et al. ............... 382/100 |
| 6,868,497 B1 | 3/2005 | Levy .......................... 713/200 |
| 6,959,100 B2 | 10/2005 | Rhoads ...................... 382/100 |
| 6,987,862 B2 | 1/2006 | Rhoads ...................... 382/100 |
| 6,990,453 B2 | 1/2006 | Wang et al. ................ 704/270 |
| 7,006,555 B1 | 2/2006 | Srinivasan ................. 375/133 |
| 7,010,144 B1 | 3/2006 | Davis et al. ................ 382/100 |
| 7,020,304 B2 | 3/2006 | Alattar et al. .............. 382/100 |
| 7,035,427 B2 | 4/2006 | Rhoads ...................... 382/100 |
| 7,047,241 B1 | 5/2006 | Erickson ....................... 707/9 |
| 7,047,413 B2 | 5/2006 | Yacobi et al. .............. 713/176 |
| 7,050,603 B2 | 5/2006 | Rhoads et al. .............. 382/100 |
| 7,058,697 B2 | 6/2006 | Rhoads ...................... 709/217 |
| 7,113,614 B2 | 9/2006 | Rhoads ...................... 382/100 |
| 7,127,744 B2 | 10/2006 | Levy .............................. 726/26 |
| 7,171,016 B1 | 1/2007 | Rhoads ...................... 382/100 |
| 7,248,717 B2 | 7/2007 | Rhoads ...................... 382/100 |
| 7,266,704 B2 | 9/2007 | Levy .......................... 713/193 |
| 7,372,976 B2 | 5/2008 | Rhoads et al. .............. 382/100 |

| | | | |
|---|---|---|---|
| 7,415,129 B2 | 8/2008 | Rhoads | 382/100 |
| 2001/0004736 A1 | 6/2001 | Hirano et al. | 705/51 |
| 2001/0008557 A1 | 7/2001 | Stefik et al. | 380/202 |
| 2001/0026618 A1 | 10/2001 | Van Wie et al. | 380/232 |
| 2001/0032312 A1 | 10/2001 | Runje et al. | 713/172 |
| 2001/0042043 A1 | 11/2001 | Shear et al. | 705/51 |
| 2002/0002468 A1 | 1/2002 | Spagna et al. | 705/1 |
| 2002/0007456 A1 | 1/2002 | Peinado et al. | 713/164 |
| 2002/0019814 A1 | 2/2002 | Ganesan | 705/59 |
| 2002/0048369 A1 | 4/2002 | Ginter et al. | 380/277 |
| 2002/0059238 A1 | 5/2002 | Saito | 707/9 |
| 2002/0062252 A1 | 5/2002 | Van Zoest et al. | 705/14 |
| 2002/0065780 A1 | 5/2002 | Barritz et al. | 705/59 |
| 2002/0107803 A1 | 8/2002 | Lisanke et al. | 705/51 |
| 2002/0112171 A1 | 8/2002 | Ginter et al. | 713/185 |
| 2002/0186844 A1 | 12/2002 | Levy et al. | 380/231 |
| 2003/0056103 A1 | 3/2003 | Levy et al. | 713/176 |

FOREIGN PATENT DOCUMENTS

| | | |
|---|---|---|
| EP | 0 493091 A1 | 7/1992 |
| GB | 2 260 246 A | 7/1993 |
| GB | 2 292 506 A | 2/1996 |
| JP | 5-37795 A | 2/1993 |
| WO | 89/09985 A1 | 10/1989 |
| WO | 93/07689 A1 | 4/1993 |
| WO | 94/11989 A1 | 5/1994 |
| WO | 96/31049 A1 | 10/1996 |

OTHER PUBLICATIONS

Burgett et al., "Copyright Labeling of Digitized Image Data," IEEE Communications Magazine, Mar. 1998, pp. 94-100.*
Herrigel et al., "Secure Copyright Protection Techniques for Digital Images," Information Hiding 1998, LNCS vol. 1525, Apr. 1998, pp. 169-190.*
Namba, S. et al., "A Program Identification Code Transmission System Using Low-Frequency Audio Signals," NHK Laboratories Note, Ser. No. 314, Mar. 1985.
Steele, R. et al., "Embedding Data in Speech using Scrambling Techniques," IEEE International Conference on Acoustics, Speech and Signal Processing, vol. 3, May 1982.
Steele, R. et al., "Simultaneous Transmission of Speech and Data Using Code-Breaking Techniques," The Bell System Tech. Jour., vol. 60, No. 9, pp. 2081-2105, Nov. 1981.
ten Kate, et al., "Digital Audio Carrying Extra Information," Philips Research Labs, pp. 1097-1100, IEEE 1990.
"Simultaneous subliminal signalling in conventional sound circuits: a feasibility study," BBC Research Department Report No. 1971/1.
P.C.J. Hill, "Simultaneous Subliminal Signalling in Conventional Sound Circuits," BBC Engineering, No. 90, pp. 14-31, 1972.
Bender et al., "Techniques for Data Hiding," Proc. SPIE vol. 2420: Storage and Retrieval for Image and Video Databases III, Mar. 1995, pp. 164-173.
Brassil et al., "Electronic Marking and Identification Techniques to Discourage Document Copying," Proceedings of INFOCOM '94 Conference on Computers, pp. 1278-1287, Jun. 12-16, 1994 (presented at IEEE Communications Society Conference).
Dautzenberg, "Watermarking Images," Trinity College (Dublin) Dept. of Microelectronics and Electrical Engineering (47 pages), Oct. 1994.
Kageyama et al, Melody Retrieval with Humming, Proceedings of Int. Computer Music Conference (ICMC), 1993.
Komatsu et al., "Authentication System Using Concealed Image in Telematics," Memoirs of the School of Science & Engineering, Waseda Univ., No. 52 pp. 45-60, 1988.
Matsui, et al., "Video-Steganography: How to Secretly Embed a Signature in a Picture," IMA Intellectual Property Project Proceeding, vol. 1 issue 1 pp. 187-205, Jan. 1994.
Matsutani et al., "A construction of Copyright-Protected Image Data," Technical Report of IEICE, ISEC94-58, Mar. 1995 (English Translation).
Quisquater, J., et al., "Access Control and Copyright Protection for Images, WorkPackage 8: Watermarking" (46 pages), Jun. 30, 1995.
Quisquater, J., et al., "Conditional Access and Copyright Protection Based on the Use of Trusted Third Parties" (43 pages), 1995.
Szepanski, W., "A Signal Theoretic Method for Creating Forgery-Proof Documents for Automatic Verification," Proc. of 1979 Carnahan Conference on Crime Countermeasures, pp. 101-109, May 16, 1979.
Szepanski, W., "Additive Binary Data Transmission for Video Signals," Presented at Conference of the Communications Engineering Society, Sep. 30, 1980, NTG Technical Reports, vol. 74, pp. 343-351.
Tanaka et al., "Embedding the Attribute Information Into a Dithered Image," Systems and Computers in Japan, vol. 21 No. 7 pp. 43-50, 1990.
Tanaka et al., "New Integrated Coding Schemes for Computer-Aided Facsimile," Proc. of IEEE Int'l Conf. on Sys. Integration, pp. 275-281, Apr. 1990.
Tanaka et al., "A Visual Retrieval System with Private Information For Image Database", Nat'l Defense Academy (Japan) Dept. of Computer Science, Proc. of Int'l Conf. On DSP Applications and Technology, pp. 415-421, Oct. 1991.
May 20, 2008 Office Action from Assignee's U.S. Appl. No. 11/775,726 and Jun. 3, 2008 Amendment in response thereto.
Claims as filed on May 7, 2008 from assignee's U.S. Appl. No. 12/116,645.
Dec. 20, 2005 Amendment after Allowance; Dec. 13, 2005 Notice of Allowance (including Examiner's Interview summary); Nov. 21, 2005 Supplemental Amendment; Oct. 21, 2005 Amendment; Jul. 22, 2005 non-final Office Action; all from assignee's U.S. Appl. No. 10/821,414 (issued as US Patent No. 7,035,427).
Mar. 12, 2007 Notice of Allowance; Feb. 16, 2007 Amendment with RCE; Nov. 17, 2006 Notice of Allowance; Oct. 24, 2006 Amendment; Jul. 19, 2006 non-final Office Action; all from assignee's U.S. Appl. No. 11/191,328 (issued as US Patent No. 7,248,717).

* cited by examiner

METHODS FOR STEGANOGRAPHIC ENCODING MEDIA

RELATED APPLICATION DATA

This application is a continuation of U.S. patent application Ser. No. 10/208,735, filed Jul. 29, 2002 (U.S. Pat. No. 6,922,480), which is a continuation of U.S. patent application Ser. No. 09/293,601, filed Apr. 15, 1999 (U.S. Pat. No. 6,427,020) which is a divisional application of U.S. patent application Ser. No. 09/074,034, filed May 6, 1998 (U.S. Pat. No. 6,449,377), which is a continuation-in-part of application Ser. No. 08/438,159, filed May 8, 1995 (U. S. Pat. No. 5,850,481), and claims priority to provisional application 60/082,228, filed Apr. 16, 1998.

U.S. patent application Ser. No. 09/293,601 is also a continuation-in-part of application 09/234,780, filed Jan. 20, 1999 (now abandoned), which claims priority to provisional application 60/071,983, filed Jan. 20, 1998.

(The specification of application Ser. No. 08/438,159 is substantially identical to that of applicant's issued patents U.S. Pat. Nos. 5,636,292, 5,710,834, 5,748,763, 5,748,783. The specification of application 60/082,228 is attached hereto as Appendix A.)

Patent application Ser. No. 09/293,602 (now U.S. Pat. No. 6,285,776), entitled Methods for Identifying Equipment Used in Counterfeiting, was filed as a sibling application of parent application Ser. No. 09/293,601.

The subject matter of this application is also related to that of the present assignee's other applications, namely Ser. No. 08/508,083 (now U.S. Pat. No. 5,841,978), Ser. No. 08/534,005 (now U.S. Pat. No. 5,832,119), Ser. No. 08/637,531 (now U.S. Pat. No. 5,822,436), Ser. No. 08/649,419 (now U.S. Pat. No. 5,862,260), Ser. No. 08/746,613 (now U.S. Pat. No. 6,122,403), Ser. No. 08/951,858 (now U.S. Pat. No. 6,026,193), and Ser. No. 08/969,072 (now U.S. Pat. No. 5,809,160), and the allowed applications referenced below.

FIELD OF THE INVENTION

The present invention relates to methods and devices for recognizing banknotes and responding accordingly (e.g., by intervening to prevent attempted banknote counterfeiting).

BACKGROUND AND SUMMARY OF THE INVENTION

Watermarking is a quickly growing field of endeavor, with several different approaches. The present assignee's work is reflected in U.S. Pat. Nos. 5,710,834, 5,636,292, 5,721,788, 5,748,763, 5,748,783, and 5,745,604, in allowed U.S. application Ser. Nos. 08/327,426 (now U.S. Pat. No. 5,768,426), Ser. No. 08/508,083 (now U.S. Pat. No. 5,841,978), Ser. No. 08/438,159 (now U.S. Pat. No. 5,850,481), and in laid-open PCT application WO 97/43736. Other work is illustrated by U.S. Pat. Nos. 5,734,752, 5,646,997, 5,659,726, 5,664,018, 5,671,277, 5,687,191, 5,687,236, 5,689,587, 5,568,570, 5,572,247, 5,574,962, 5,579,124, 5,581,500, 5,613,004, 5,629,770, 5,461,426, 5,743,631, 5,488,664, 5,530,759, 5,539,735, 4,943,973, 5,337,361, 5,404,160, 5,404,377, 5,315,098, 5,319,735, 5,337,362, 4,972,471, 5,161,210, 5,243,423, 5,091,966, 5,113,437, 4,939,515, 5,374,976, 4,855,827, 4,876,617, 4,939,515, 4,963,998, 4,969,041, and published foreign applications WO 98/02864, EP 822,550, WO 97/39410, WO 96/36163, GB 2,196,167, EP 777,197, EP 736,860, EP 705,025, EP 766,468, EP 782,322, WO 95/20291, WO 96/26494, WO 96/36935, WO 96/42151, WO 97/22206, WO 97/26733. Some of the foregoing patents relate to visible watermarking techniques. Other visible watermarking techniques (e.g. data glyphs) are described in U.S. Pat. Nos. 5,706,364, 5,689,620, 5,684,885, 5,680,223, 5,668,636, 5,640,647, 5,594,809.

Most of the work in watermarking, however, is not in the patent literature but rather in published research. In addition to the patentees of the foregoing patents, some of the other workers in this field (whose watermark-related writings can by found by an author search in the INSPEC database) include I. Pitas, Eckhard Koch, Jian Zhao, Norishige Morimoto, Laurence Boney, Kineo Matsui, A. Z. Tirkel, Fred Mintzer, B. Macq, Ahmed H. Tewfik, Frederic Jordan, Naohisa Komatsu, and Lawrence O'Gorman.

The artisan is assumed to be familiar with the foregoing prior art.

In the following disclosure it should be understood that references to watermarking encompass not only the assignee's watermarking technology, but can likewise be practiced with any other watermarking technology, such as those indicated above.

Watermarking can be applied to myriad forms of information. The present disclosure focuses on its applications to line art imagery, of the sort typically employed in banknotes, travelers checks, passports, stock certificates, and the like (hereafter collectively referred to as "banknotes"). However, it should be recognized that the principles discussed below can also be applied outside this particular field.

Most of the prior art in image watermarking has focused on pixelated imagery (e.g. bit-mapped images, JPEG/MPEG imagery, VGA/SVGA display devices, etc.). In most watermarking techniques, the luminance or color values of component pixels are slightly changed to effect subliminal encoding of binary data through the image. (This encoding can be done directly in the pixel domain, or in another domain, such as the DCT domain.) In some systems, isolated pixels are changed in accordance with one or more bits of the binary data; in others, plural domain-related groupings of pixels (e.g. locally adjoining, or corresponding to a given DCT component) are so changed. In all cases, however, pixels have served as the ultimate carriers of the embedded data.

While pixelated imagery is a relatively recent development, line art goes back centuries. One familiar example is U.S. paper currency. On the one dollar banknote, for example, line art is used in several different ways. One is to form intricate webbing patterns around the margin of the note (generally comprised of light lines on dark background). Another is so form grayscale imagery, such as the portrait of George Washington (generally comprised of dark lines on a light background).

In an illustrative embodiment of the present invention, the line art on a banknote or other security document is slightly changed to effect the encoding of plural-bit digital data (i.e. the banknote is digitally watermarked). When such a banknote is thereafter scanned, the resulting image data can be recognized as corresponding to a banknote by detection of the encoded data. (Alternatively, the image data can be recognized as corresponding to a banknote by machine detection of other forms of watermarking, or by reference to visible structures characteristic of banknotes.)

In response to detection of a banknote, the detecting apparatus (e.g., a scanner, photocopier, or printer) can intervene so as to prevent or deter counterfeiting. For example, the apparatus can interrupt a copying operation, and display a message reminding the operator that it is illegal to reproduce currency. Another option is to dial a remote service and report the attempted reproduction of a banknote. Yet another option is to permit the copying, but to insert forensic tracer data (e.g. steganographically encoded binary data) in the resultant copy. The tracer data can memorialize the serial number of the machine that made the copy and/or the date and time the copy was made.

To address privacy concerns, such tracer data is not normally inserted in photocopied output, but is so inserted only when the subject being photocopied is detected as being a banknote.

The foregoing features and advantages of the invention will be more readily apparent from the following detailed description, which proceeds with reference to the accompanying drawings.

DETAILED DESCRIPTION

Figure 1A:
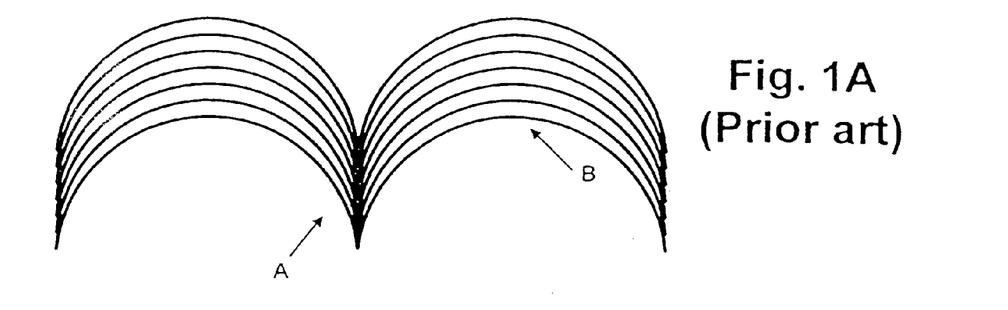
FIGS. 1A and 1B show prior art techniques for achieving grayscale effects using line art.
Figure 1B:
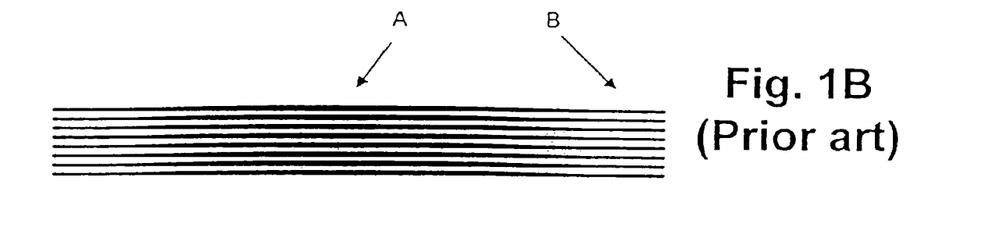
Figure 2:
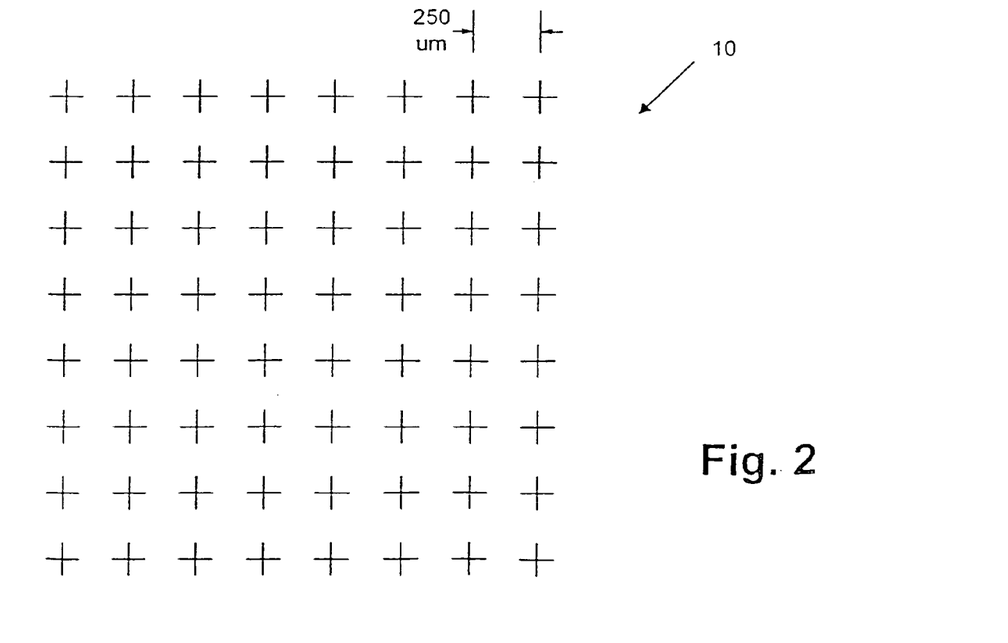
FIG. 2 shows a virtual array of grid points that can be imposed on an image according to one embodiment of the present invention.

Referring to FIG. 2, an illustrative form of the invention employs a grid 10 of imaginary reference points arrayed over a line art image. The spacing between points is 250 µm in the illustrated arrangement, but greater or lesser spacings can of course be used.

Figure 3:
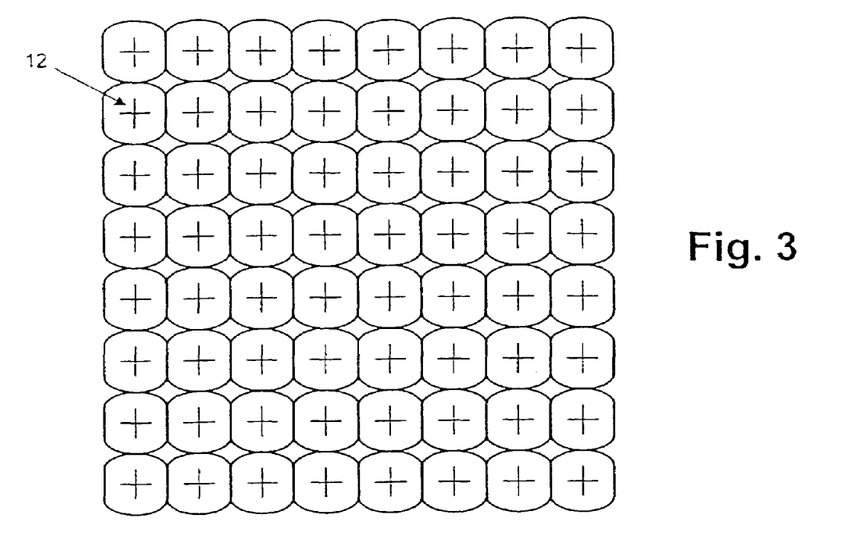
FIG. 3 shows a virtual array of regions that can be imposed on an image according to the FIG. 2 embodiment.

Associated with each grid point is a surrounding region 12, shown in FIG. 3. As described below, the luminosity (or reflectance) of each of these regions 12 is slightly changed to effect the subliminal encoding of binary data.

Region 12 can take various shapes; the illustrated rounded-rectangular shape is representative only. (The illustrated shape has the advantage of encompassing a fairly large area while introducing fewer visual artifacts than, e.g., square regions.) In other embodiments, squares, rectangles, circles, ellipses, etc., can alternatively be employed.

Figure 4:
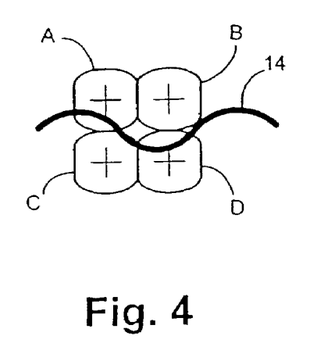
FIG. 4 shows an excerpt of FIG. 3 with a line from a line art image passing therethrough.

FIG. 4 is a magnified view of an excerpt of FIG. 3, showing a line 14 passing through the grid of points. The width of the line, of course, depends on the particular image of which it is a part. The illustrated line is about 25 µm in width; greater or lesser widths can naturally be used.

Figure 5:
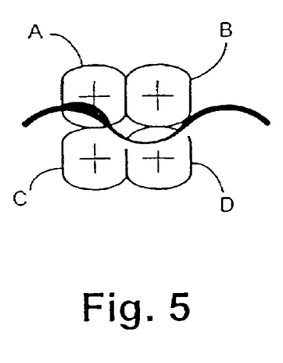
FIG. 5 shows changes to the width of the line of FIG. 3 to effect watermark encoding according to one embodiment of the present invention.

In a first embodiment of the invention, shown in FIG. 5, the width of the line is controllably varied so as to change the luminosity of the regions through which it passes. To increase the luminosity (or reflectance), the line is made narrower (i.e. less ink in the region). To decrease the luminosity, the line is made wider (i.e. more ink).

Whether the luminance in a given region should be increased or decreased depends on the particular watermarking algorithm used. Any algorithm can be used, by changing the luminosity of regions 12 as the algorithm would otherwise change the luminance or colors of pixels in a pixelated image.

In an exemplary algorithm, the binary data is represented as a sequence of −1s and 1s, instead of 0s and 1s. (The binary data can comprise a single datum, but more typically comprises several. In an illustrative embodiment, the data comprises 100 bits.)

Each element of the binary data sequence is then multiplied by a corresponding element of a pseudo-random number sequence, comprised of −1s and 1s, to yield an intermediate data signal. Each element of this intermediate data signal is mapped to a corresponding sub-part of the image, such as a region 12. The image in (and optionally around) this region is analyzed to determine its relative capability to conceal embedded data, and a corresponding scale factor is produced. Exemplary scale factors may range from 0 to 3. The scale factor for the region is then multiplied by the element of the intermediate data signal mapped to the region in order to yield a "tweak" value for the region. In the illustrated case, the resulting tweaks can range from −3 to 3. The luminosity of the region is then adjusted in accordance with the tweak value. A tweak value of −3 may correspond to a −5% change in luminosity; −2 may correspond to −2% change; −1 may correspond to −1% change; 0 may correspond to no change; 1 may correspond to +1% change; 2 may correspond to +2% change, and 3 may correspond to +5% change. (This example follows the basic techniques described in the Real Time Encoder embodiment disclosed in patent 5,710,834.)

In FIG. 5, the watermarking algorithm determined that the luminance of region A should be reduced by a certain percentage, while the luminance of regions C and D should be increased by certain percentages.

In region A, the luminance is reduced by increasing the line width. In region D, the luminance is increased by reducing the line width; similarly in region C (but to a lesser extent).

No line passes through region B, so there is no opportunity to change the region's luminance. This is not fatal to the method, however, since the watermarking algorithm redundantly encodes each bit of data in sub-parts spaced throughout the line art image.

The changes to line widths in regions A and D of FIG. 5 are exaggerated for purposes of illustration. While the illustrated variance is possible, most implementations will modulate the line width 3-50% (increase or decrease).

(Many watermarking algorithms routinely operate within a signal margin of about +/−1% changes in luminosity to effect encoding. That is, the "noise" added by the encoding amounts to just 1% or so of the underlying signal. Lines typically don't occupy the full area of a region, so a 10% change to line width may only effect a 1% change to region luminosity, etc. Banknotes are different from photographs in that the art need not convey photorealism. Thus, banknotes can be encoded with higher energy than is used in watermarking photographs, provided the result is still aesthetically satisfactory. To illustrate, localized luminance changes on the order of 10% are possible in banknotes, while such a level of watermark energy in photographs would generally be considered unacceptable. In some contexts, localized luminance changes of 20, 30, 50 or even 100% are acceptable.)

In the illustrated embodiment, the change to line width is a function solely of the tweak to be applied to a single region. Thus, if a line passes through any part of a region to which a tweak of 2% is to be applied, the line width in that region is changed to effect the 2% luminance difference. In variant embodiments, the change in line width is a function of the line's position in the region. In particular, the change in line width is a function of the distance between the region's center grid point and the line's closest approach to that point. If the line passes through the grid point, the full 2% change is effected. At successively greater distances, successively less change is applied. The manner in which the magnitude of the tweak changes as a function of line position within the region can be determined by applying one of various interpolation algorithms, such as the bi-linear, bi-cubic, cubic splines, custom curve, etc.

In other variant embodiments, the change in line width in a given region is a weighted function of the tweaks for adjoining or surrounding regions. Thus, the line width in one region may be increased or decreased in accordance with a tweak value corresponding to one or more adjoining regions.

Combinations of the foregoing embodiments can also be employed.

In the foregoing embodiments, it is sometimes necessary to trade-off the tweak values of adjoining regions. For example, a line may pass along a border between regions, or pass through the point equidistant from four grid points ("equidistant zones"). In such cases, the line may be subject to conflicting tweak values—one region may want to increase the line width, while another may want to decrease the line width. (Or both may want to increase the line width, but differing amounts.) Similarly in cases where the line does not pass through an equidistant zone, but the change in line width is a function of a neighborhood of regions whose tweaks are of different values. Again, known interpolation functions can be employed to determine the weight to be given the tweak from each region in determining what change is to be made to the line width in any given region.

In the exemplary watermarking algorithm, the average change in luminosity across the image is zero, so no generalized lightening or darkening of the image is apparent. The localized changes in luminosity are so minute in magnitude, and localized in position, that they are essentially invisible (e.g. inconspicuous/subliminal) to human viewers.

Figure 6:
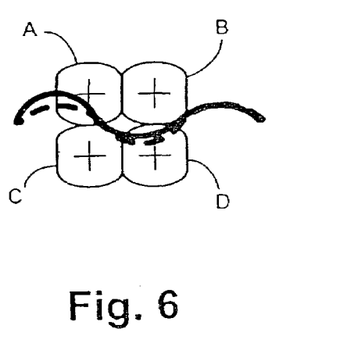
FIG. 6 shows changes to the position of the line of FIG. 3 to effect watermark encoding according to another embodiment of the present invention.

An alternative embodiment is shown in FIG. 6, in which line position is changed rather than line width.

In FIG. 6 the original position of the line is shown in dashed form, and the changed position of the line is shown in solid form. To decrease a region's luminosity, the line is moved slightly closer to the center of the grid point; to increase a region's luminosity, the line is moved slightly away. Thus, in region A, the line is moved towards the center grid point, while in region D it is moved away.

It will be noted that the line on the left edge of region A does not return to its nominal (dashed) position as it exits the region. This is because the region to the left of region A also is to have decreased luminosity. Where possible, it is generally preferable not to return a line to its nominal position, but instead permit shifted lines to remain shifted as they enter adjoining regions. So doing permits a greater net line movement within a region, increasing the embedded signal level.

Again, the line shifts in FIG. 6 are somewhat exaggerated. More typical line shifts are on the order of 3-50 µm.

One way to think of the FIG. 6 embodiment is to employ a magnetism analogy. The grid point in the center of each region can be thought of as a magnet. It either attracts or repels lines. A tweak value of −3, for example, may correspond to a strong-valued attraction force; a tweak value of +2 may correspond to a middle-valued repulsion force, etc. In FIG. 6, the grid point in region A exhibits an attraction force (i.e. a negative tweak value), and the grid point in region D exhibits a repulsion force (e.g. a positive tweak value).

The magnetic analogy is useful because the magnetic effect exerted on a line depends on the distance between the line and the grid point. Thus, a line passing near a grid point is shifted more in position than a line near the periphery of the region.

Each of the variants discussed above in connection with FIG. 5 is likewise applicable to FIG. 6.

Combinations of the embodiments of FIGS. 5 and 6 can of course be used, resulting in increased watermark energy, better signal-to-noise ratio and, in many cases, less noticeable changes.

In still a further embodiment, the luminance in each region is changed while leaving the line unchanged. This can be effected by sprinkling tiny dots of ink in the otherwise-vacant parts of the region. In high quality printing, of the type used with banknotes, droplets on the order of 3 µm in diameter can be deposited. (Still larger droplets are still beyond the perception threshold for most viewers.) Speckling a region with such droplets (either in a regular array, or random, or according to a desired profile such as Gaussian), can readily effect a 1% or so change in luminosity. (Usually dark droplets are added to a region, effecting a decrease in luminosity. Increases in luminosity can be effected by speckling with a light colored ink, or by forming light voids in line art otherwise present in a region.)

In a variant of the speckling technique, very thin mesh lines can be inserted in the artwork—again to slightly change the luminance of one or more regions.

Although not previously mentioned, it is contemplated that the banknote will include some manner of calibration information to facilitate registration of the image for decoding. This calibration information can be steganographic or overt. Several techniques for steganographically embedding calibration information are disclosed in my prior patents and applications. Other techniques can be found in others of the cited work.

To decode watermark data, the encoded line art image must be converted into electronic form for analysis. This conversion is typically performed by a scanner.

Scanners are well known, so a detailed description is not provided here. Suffice it to say that scanners conventionally employ a line of closely spaced photodetector cells that produce signals related to the amount of the light reflected from successive swaths of the image. Most inexpensive consumer scanners have a resolution of 300 dots per inch (dpi), or a center to center spacing of component photodetectors of about 84 µm. Higher quality scanners of the sort found in most professional imaging equipment and photocopiers have resolutions of 600 dpi (42 µm), 1200 dpi (21 µm), or better.

Taking the example of a 300 dpi scanner (84 µm photodetector spacing), each 250 µm region 12 on the banknote will correspond to about a 3×3 array of photodetector samples. Naturally, only in rare instances will a given region be physically registered with the scanner so that nine photodetector samples capture the luminance in that region, and nothing else. More commonly, the line art is skewed with respect to the scanner photodetectors, or is longitudinally misaligned (i.e. some photodetectors image sub-parts of two adjoining regions). However, since the scanner oversamples the regions, the luminance of each region can unambiguously be determined.

In one embodiment, the scanned data from the line art is collected in a two dimensional array and processed—according to one of the techniques disclosed in my prior patents and applications—to detect the embedded calibration information. The array is then processed to effect a virtual re-registration of the image data. A software program then analyzes the statistics of the re-registered data (using the techniques disclosed in my prior writings) to extract the bits of the embedded data.

(Again, the reference to my earlier watermark decoding techniques is exemplary only. Once scanning begins and the data is available in pixel form, it is straightforward to apply any other watermark decoding technique to extract a correspondingly-encoded watermark.)

In a variant embodiment, the scanned data is not assembled in a complete array prior to the processing. Instead, it is processed in real-time, as it is generated, in order to detect embedded watermark data without delay. (Depending on the parameters of the scanner, it may be necessary to scan a half-inch or so of the line art image before the statistics of the resulting data unambiguously indicate the presence of a watermark.)

In accordance with another aspect of the invention, various hardware devices are provided with the capability to recognize embedded watermark data in any line art images they process, and to respond accordingly.

One example is a color photocopier. Such devices employ a color scanner to generate sampled (pixel) data corresponding to an input media (e.g. a dollar bill). If watermark data associated with a banknote is detected, the photocopier can take one or more steps.

One option is simply to interrupt copying, and display a message reminding the operator that it is illegal to reproduce currency.

Another option is to dial a remote service and report the attempted reproduction of a banknote. Photocopiers with dial-out capabilities are known in the art (e.g. U.S. Pat. No. 5,305,199) and are readily adapted to this purpose. The remote service can be an independent service, or can be a government agency.

Figure 7:
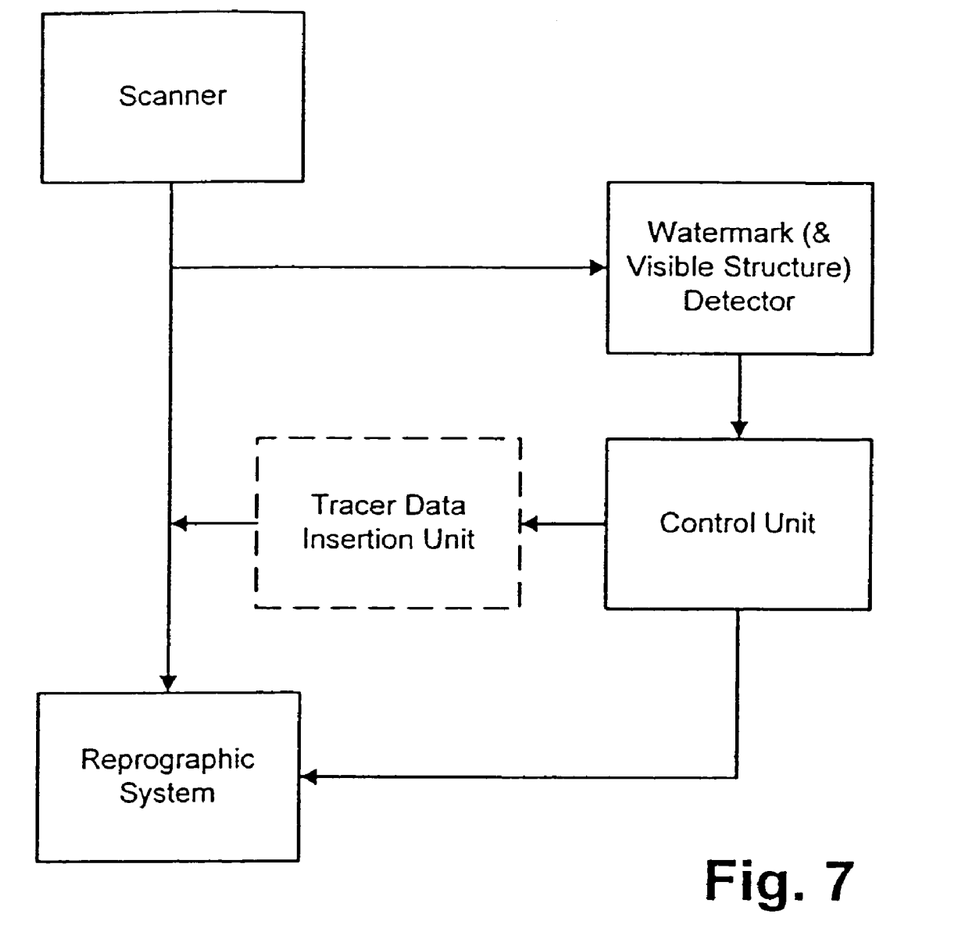
FIG. 7 is a block diagram of a photocopier according to another embodiment of the invention.

Yet another option is to permit the copying, but to insert forensic tracer data in the resultant copy. This tracer data can take various forms. Steganographically encoded binary data is one example. An example is shown in U.S. Pat. No. 5,568,268. The tracer data can memorialize the serial number of the machine that made the copy and/or the date and time the copy was made. To address privacy concerns, such tracer data is not normally inserted in photocopied output, but is so inserted only when the subject being photocopied is detected as being a banknote. (Such an arrangement is shown in FIG. 7.)

Desirably, the scan data is analyzed on a line-by-line basis in order to identify illicit photocopying with a minimum of delay. If a banknote is scanned, one or more lines of scanner output data may be provided to the photocopier's reprographic unit before the banknote detection decision has been made. In this case the photocopy will have two regions: a first region that is not tracer-marked, and a second, subsequent region in which the tracer data has been inserted.

Photocopiers with other means to detect not-to-be-copied documents are known in the art, and employ various response strategies. Examples are detailed in U.S. Pat. Nos. 5,583,614, 4,723,149, 5,633,952, 5,640,467, and 5,424,807.

Another hardware device that can employ the foregoing principles is a standalone scanner. A programmed processor (or dedicated hardware) inside the scanner analyzes the data being generated by the device, and responds accordingly.

Yet another hardware device that can employ the foregoing principles is a printer. A processor inside the device analyzes graphical image data to be printed, looking for watermarks associated with banknotes.

For both the scanner and printer devices, response strategies can include disabling operation, or inserting tracer information. (Such devices typically do not have dial-out capabilities.)

Again, it is desirable to process the scanner or printer data as it becomes available, so as to detect any banknote processing with a minimum of delay. Again, there will be some lag time before a detection decision is made. Accordingly, the scanner or printer output will be comprised of two parts, one without the tracer data, and another with the tracer data.

Banknotes presently include various visible structures that can be used as aids in banknote detection (e.g. the seal of the issuing central bank, and various geometrical markings). In accordance with a further aspect of the present invention, a banknote is analyzed by an integrated system that considers both the visible structures and watermark-embedded data.

Visible banknote structures can be sensed using known pattern recognition techniques. Examples of such techniques are disclosed in U.S. Pat. Nos. 5,321,773, 5,390,259, 5,533,144, 5,539,841, 5,583,614, 5,633,952, 4,723,149 and 5,424,807 and laid-open foreign application EP 766,449.

In photocopiers (and the like) equipped to detect both visible and watermarked banknote markings, the detection of either causes one or more of the above-noted banknote responses to be initiated.

Again, scanners and printers can be equipped with a similar capability—analyzing the data for either of these banknote hallmarks. If either is detected, the software (or hardware) responds accordingly.

Identification of banknotes by watermark data provides an important advantage over recognition by visible structures—it cannot so easily be defeated. A banknote can be doctored (e.g. by white-out, scissors, or less crude techniques) to remove/obliterate the visible structures. Such a document can then be freely copied on either a visible structure-sensing photocopier or scanner/printer installation. The removed visible structure can then be added in via a second printing/photocopying operation. If the printer is not equipped with banknote-disabling capabilities, image-editing tools can be used to insert visible structures back into image data sets scanned from such doctored bills, and the complete bill freely printed. By additionally including embedded watermark data in the banknote, and sensing same, such ruses will not succeed.

(A similar ruse is to scan a banknote image on a non-banknote-sensing scanner. The resulting image set can then be edited by conventional image editing tools to remove/obliterate the visible structures. Such a data set can then be printed—even on a printer/photocopier that examines such data for the presence of visible structures. Again, the missing visible structures can be inserted by a subsequent printing/photocopying operation.)

Desirably, the visible structure detector and the watermark detector are integrated together as a single hardware and/or software tool. This arrangement provides various economies, e.g., in interfacing with the scanner, manipulating pixel data sets for pattern recognition and watermark extraction, electronically re-registering the image to facilitate pattern recognition/watermark extraction, issuing control signals (e.g. disabling) signals to the photocopier/scanner, etc.

(To provide a comprehensive disclosure without unduly lengthening the following specification, applicants incorporate by reference the patent documents cited above (except applications Ser. No. 09/234,780 and 60/071,983).)

From the foregoing, it will be recognized that embodiments according to the present invention allow banknotes to be recognized based on optical scan data, and responsive actions taken, thereby reducing the risk of counterfeiting. Other devices, responsive to authentic banknotes, are enabled.

Having described and illustrated the principles of my invention with reference to several illustrative embodiments, it will be recognized that these embodiments are exemplary only and should not be taken as limiting the scope of my invention. Guided by the foregoing teachings, it should be apparent that other watermarking, decoding, and anti-counterfeiting technologies can be substituted for, and/or combined with, the elements detailed above to yield similar effects.

While the invention has been described with reference to embodiments employing regular rectangular arrays of grid points, those skilled in the art will recognize that other arrays of points—neither rectangular nor regular—can alternatively be used.

While the invention has been described with reference to embodiments that scale the embedded energy in accordance with local image characteristics, in other embodiments a manually crafted energy profile can be implemented. That is, a mask defining embedded signal magnitudes at different parts of the image can be manually devised, and employed to tailor the change in luminance in each region.

In view of the many possible embodiments to which the principles of the invention may be put, it should be recognized that the detailed embodiments are illustrative only and should not be taken as limiting the scope of my invention. Rather, I claim as my invention all such embodiments as may come within the scope and spirit of the following claims and equivalents thereto.

APPENDIX A

Watermarking Methods, Apparatuses, and Applications (To provide a comprehensive disclosure without unduly lengthening the following specification, applicants incorporate by reference the cited patent documents.)

Watermarking is a quickly growing field of endeavor, with several different approaches. The present assignee's work is reflected in U.S. Pat. Nos. 5,710,834, 5,636,292, 5,721,788, allowed U.S. application Ser. Nos. 08/327,426, 08/598,083, 08/436,134 (to issue as U.S. Pat. No. 5,748,763), Ser. No. 08/436,102 (to issue as U.S. Pat. No. 5,748,783), and Ser. No. 08/614,521 (to issue as U.S. Pat. No. 5,745,604), and laid-open PCT application WO97/43736. Other work is illustrated by U.S. Pat. Nos. 5,734,752, 5,646,997, 5,659,726, 5,664,018, 5,671,277, 5,687,191, 5,687,236, 5,689,587, 5,568,570, 5,572,247, 5,574,962, 5,579,124, 5,581,500, 5,613,004, 5,629,770, 5,461,426, 5,743,631, 5,488,664, 5,530,759, 5,539,735, 4,943,973, 5,337,361, 5,404,160, 5,404,377, 5,315,098, 5,319,735, 5,337,362, 4,972,471, 5,161,210, 5,243,423, 5,091,966, 5,113,437, 4,939,515, 5,374,976, 4,855,827, 4,876,617, 4,939,515, 4,963,998, 4,969,041, and published foreign applications WO 98/02864, EP 822,550, WO 97/39410, WO 96/36163, GB 2,196,167, EP 777,197, EP 736,860, EP 705,025, EP 766,468, EP 782,322, WO 95/20291, WO 96/26494, WO 96/36935, WO 96/42151, WO 97/22206, WO 97/26733. Some of the foregoing patents relate to visible watermarking techniques. Other visible watermarking techniques (e.g. data glyphs) are described in U.S. Pat. Nos. 5,706,364, 5,689,620, 5,684,885, 5,680,223, 5,668,636, 5,640,647, 5,594,809.

Most of the work in watermarking, however, is not in the patent literature but rather in published research. In addition to the patentees of the foregoing patents, some of the other workers in this field (whose watermark-related writings can by found by an author search in the INSPEC database) include 1. Pitas, Eckhard Koch, Jian Zhao, Norishige Morimoto, Laurence Boney, Kineo Matsui, Ariz. Tirkel, Fred Mintzer, B. Macq, Ahmed H. Tewfik, Frederic Jordan, Naohisa Komatsu, and Lawrence O'Gorman.

The artisan is assumed to be familiar with the foregoing prior art.

In the following disclosure it should be understood that references to watermarking encompass not only the assignee's watermarking technology, but can likewise be practiced with any other watermarking technology, such as those indicated above.

Watermarking can be applied to myriad forms of information. These include imagery (including video) and audio—whether represented in digital form (e.g. an image comprised of pixels, digital video, etc.), or in an analog representation (e.g. non-sampled music, printed imagery, banknotes, etc) Watermarking can be applied to digital content (e.g. imagery, audio) either before or after compression. Watermarking can also be used in various "description" or "synthesis" language representations of content, such as Structured Audio, Csound, NetSound, SNHC Audio and the like (c.f. http//sound.media-a.mit.edu/mpeg4/) by specifying synthesis commands that generate watermark data as well as the intended audio signal. Watermarking can also be applied to ordinary media, whether or not it conveys information. Examples include paper, plastics, laminates, paper/film emulsions, etc. A watermark can embed a single bit of information, or any number of bits.

The physical manifestation of watermarked information most commonly takes the form of altered signal values, such as slightly changed pixel values, picture luminance, picture colors, DCT coefficients, instantaneous audio amplitudes, etc. However, a watermark can also be manifested in other ways, such as changes in the surface microtopology of a medium, localized chemical changes (e.g. in photographic emulsions), localized variations in optical density, localized changes in luminescence, etc. Watermarks can also be optically implemented in holograms and conventional paper watermarks.

One improvement to existing technology is to employ established web crawler services (e.g. Alta Vista, Excite, or Inktomi) to search for watermarked content (on the Web, in internet news groups, BBS systems, on-line systems, etc.) in addition to their usual data collecting/indexing operations. Such crawlers can download files that may have embedded watermarks (e.g. *.JPG, *.WAV, etc.) for later analysis. These files can be processed, as described below, in real time. More commonly, such files are queued and processed by a computer distinct from the crawler computer. Instead of performing watermark-read operations on each such file, a screening technique can be employed to identify those most likely to be conveying watermark data. One such technique is to perform a DCT operation on an image, and look for spectral coefficients associated with certain watermarking techniques (e.g. coefficients associated with an inclined embedded subliminal grid). To decode spread-spectrum based watermarks, the analyzing computer requires access to the noise signal used to spread the data signal In one embodiment, interested parties submit their noise/key signals to the crawler service so as to enable their marked content to be located. The crawler service maintains such information in confidence, and uses different noise signals in decoding an image (image is used herein as a convenient shorthand for imagery, video, and audio) until watermarked data is found (if present). This allows the use of web crawlers to locate content with privately-coded watermarks, instead of just publicly-coded watermarks as is presently the case. The queueing of content data for analysis provides certain opportunities for computational shortcuts. For example, like-sized images (e.g. 256×256 pixels) can be tiled into a larger image, and examined as a unit for the presence of watermark data. If the decoding technique (or the optional pre-screening technique) employs a DCT transform or the like, the block size of the transform can be tailored to correspond to the tile size (or some integral fraction thereof). Blocks indicated as likely having watermarks can then be subjected to a full read operation. If the queued data is sorted by file name, file size, or checksum, duplicate files can be identified. Once such duplicates are identified, the analysis computer need consider only one instance of the file. If watermark data is decoded from such a file, the content provider can be informed of each URL at which copies of the file were found.

Some commentators have observed that web crawler-based searches for watermarked images can be defeated by breaking a watermarked image into sub-blocks (tiles). HTML instructions, or the like, cause the sub-blocks to be presented in tiled fashion, recreating the complete image. However, due to the small size of the component sub-blocks, watermark reading is not reliably accomplished.

This attack is overcome by instructing the web-crawler to collect the display instructions (e.g. HTML) by which image files are positioned for display on a web page, in addition to the image files themselves. Before files collected from a web page are scrutinized for watermarks, they can be concatenated in the arrangement specified by the display instructions. By this arrangement, the tiles are reassembled, and the watermark data can be reliably recovered.

Another such postulated attack against web crawler detection of image watermarks is to scramble the image (and thus the watermark) in a file, and employ a Java applet or the like to unscramble the image prior to viewing. Existing web crawlers inspect the file as they find it, so the watermark is not detected. However, just as the Java descrambling applet can be invoked when a user wishes access to a file, the same applet can similarly be employed in a web crawler to overcome such attempted circumvention of watermark detection.

Although "content" can be located and indexed by various web crawlers, the contents of the "content" are unknown. A *.JPG file, for example, may include pornography, a photo of a sunset, etc.

Watermarks can be used to indelibly associate meta-data within content (as opposed to stored in a data structure that forms another part of the object, as is conventionally done with meta-data). The watermark can include text saying "sunset" or the like. More compact information representations can alternatively be employed (e.g. coded references). Still further, the watermark can include (or consist entirely of) a Unique ID (UID) that serves as an index (key) into a network-connected remote database containing the meta data descriptors. By such arrangements, web crawlers and the like can extract and index the meta-data descriptor tags, allowing searches to be conducted based on semantic descriptions of the file contents, rather than just by file name.

Existing watermarks commonly embed information serving to communicate copyright information. Some systems embed text identifying the copyright holder. Others embed a UID which is used as an index into a database where the name of the copyright owner, and associated information, is stored.

Looking ahead, watermarks should serve more than as silent copyright notices. One option is to use watermarks to embed "intelligence" in content. One form of intelligence is knowing its "home." "Home" can be the URL of a site with which the content is associated. A photograph of a car, for example, can be watermarked with data identifying the web site of an auto-dealer that published the image. Wherever the image goes, it serves as a link back to the original disseminator. The same technique can be applied to corporate logos. Wherever they are copied on the internet, a suitably-equipped browser or the like can decode the data and link back to the corporation's home page. (Decoding may be effected by positioning the cursor over the logo and pressing the right-mouse button, which opens a window of options—one of which is Decode Watermark.)

To reduce the data load of the watermark, the intelligence need not be wholly encoded in the content's watermark. Instead, the watermark can again provide a UID—this time identifying a remote database record where the URL of the car dealer, etc., can be retrieved. In this manner, images and the like become marketing agents—linking consumers with vendors (with some visual salesmanship thrown in). In contrast to the copyright paradigm, in which dissemination of imagery was an evil sought to be tracked and stopped, dissemination of the imagery can now be treated as a selling opportunity. A watermarked image becomes a portal to a commercial transaction.

(Using an intermediate database between a watermarked content file and its ultimate home (i.e. indirect linking) serves an important advantage: it allows the disseminator to change the "home" simply by updating a record in the database. Thus, for example, if one company is acquired by another, the former company's smart images can be made to point to the new company's home web page by updating a database record. In contrast, if the old company's home URL is hard-coded (i.e. watermarked) in the object, it may point to a URL that eventually is abandoned. In this sense, the intermediate database serves as a switchboard that couples the file to its current home.

The foregoing techniques are not limited to digital content files. The same approach is equally applicable with printed imagery, etc. A printed catalog, for example, can include a picture illustrating a jacket. Embedded in the picture is watermarked data. This data can be extracted by a simple hand-scanner/decoder device using straightforward scanning and decoding techniques (e.g. those known to artisans in those fields). In watermark-reading applications employing hand-scanners and the like, it is important that the watermark decoder be robust to rotation of the image, since the catalog photo will likely be scanned off-axis. One option is to encode subliminal graticules (e.g. visualization synchronization codes) in the catalog photo so that the set of image data can be post-processed to restore it to proper alignment prior to decoding.

The scanner/decoder device can be coupled to a modem-equipped computer, a telephone, or any other communications device. In the former instance, the device provides URL data to the computer's web browser, linking the browser to the catalog vendor's order page. (The device need not include its own watermark decoder; this task can be performed by the computer) The vendor's order page can detail the size and color options of the jacket, inventory availability, and solicit ordering instructions (credit card number, delivery options, etc.)—as is conventionally done with on-line merchants. Such a device connected to a telephone can dial the catalog vendor's toll-free automated order-taking telephone number (known, e.g., from data encoded in the watermark), and identify the jacket to the order center. Voice prompts can then solicit the customer's choice of size, color, and delivery options, which are input by Touch Tone instructions, or by voiced words (using known voice recognition software at the vendor facility).

In such applications, the watermark may be conceptualized as an invisible bar code employed in a purchase transaction. Here, as elsewhere, the watermark can serve as a seamless interface bridging the print and digital worlds Another way of providing content with intelligence is to use the watermark to provide Java or ActiveX code. The code can be embedded in the content, or can be stored remotely and linked to the content. When the watermarked object is activated, the code can be executed (either automatically, or at the option of the user). This code can perform virtually any function. One is to "phone home" —initiating a browser and linking to the object's home The object can then relay any manner of data to its home. This data can specify some attribute of the data, or its use. The code can also prevent accessing the underlying content until permission is received. An example is a digital movie that, when double-clicked, automatically executes a watermark-embedded Java applet which links through a browser to the movie's distributor. The user is then prompted to input a credit card number. After the number has been verified and a charge made, the applet releases the content of the file to the computer's viewer for viewing of the movie. Support for these operations is desirably provided via the computer's operating system, or plug-in software.

Such arrangements can also be used to collect user-provided demographic information when smart image content is accessed by the consumer of the content. The demographic information can be written to a remote database and can be used for market research, customization of information about the content provided to the consumer, sales opportunities, advertising, etc.

In audio and video and the like, watermarks can serve to convey related information, such as links to WWW fan sites, actor biographies, advertising for marketing tie-ins (T-shirts, CDs, concert tickets). In such applications, it is desirable (but not necessary) to display on the user interface (e.g. screen) a small logo to signal the presence of additional information. When the consumer selects the logo via some selection device (mouse, remote control button, etc.), the information is revealed to the consumer, who can then interact with it.

Much has been written (and patented) on the topic of asset rights management. Sample patent documents include U.S. Pat. Nos. 5,715,403, 5,638,443, 5,634,012, 5,629,980. Again, much of the technical work is memorialized in journal articles, which can be identified by searching for relevant company names and trademarks such as IBM's Cryptolope system, Portland Software's ZipLock system, the Rights Exchange service by Softbank Net Solutions, and the Digi-Box system from InterTrust Technologies.

An exemplary asset management system makes content available (e.g. from a web server, or on a new computer's hard disk) in encrypted form. Associated with the encrypted content is data identifying the content (e.g. a preview) and data specifying various rights associated with the content. If a user wants to make fuller use of the content, the user provides a charge authorization (e.g. a credit card) to the distributor, who then provides a decryption key, allowing access to the content. (Such systems are often realized using object-based technology. In such systems, the content is commonly said to be distributed in a "secure container.")

Desirably, the content should be marked (personalized/ serialized) so that any illicit use of the content (after decryption) can be tracked. This marking can be performed with watermarking, which assures that the mark travels with the content wherever—and in whatever form—it may go. The watermarking can be effected by the distributor—prior to dissemination of the encrypted object—such as by encoding a UID that is associated in a database with that particular container. When access rights are granted to that container, the database record can be updated to reflect the purchaser, the purchase date, the rights granted, etc. An alternative is to include a watermark encoder in the software tool used to access (e.g. decrypt) the content. Such an encoder can embed watermark data in the content as it is released from the secure container, before it is provided to the user. The embedded data can include a UID, as described above. This UID can be assigned by the distributor prior to disseminating the container. Alternatively, the UID can be a data string not known or created until access rights have been granted. In addition to the UID, the watermark can include other data not known to the distributor, e.g. information specific to the time(s) and manner(s) of accessing the content.

In other systems, access rights systems can be realized with watermarks without containers etc. Full resolution images, for example, can be freely available on the web. If a user wishes to incorporate the imagery into a web page or a magazine, the user can interrogate the imagery as to its terms and conditions of use. This may entail linking to a web site specified by the embedded watermark (directly, or through an intermediate database), which specifies the desired information. The user can then arrange the necessary payment, and use the image knowing that the necessary rights have been secured.

As noted, digital watermarks can also be realized using conventional (e.g. paper) watermarking technologies. Known techniques for watermarking media (e.g. paper, plastic, polymer) are disclosed in U.S. Pat. Nos. 5,536,468, 5,275,870, 4,760,239, 4,256,652, 4,370,200, and 3,985,927 and can be adapted to display of a visual watermark instead of a logo or the like. Note that some forms of traditional watermarks which are designed to be viewed with transmissive light can also show up as low level signals in reflective light, as is typically used in scanners. Transmissive illumination detection systems can also be employed to detect such watermarks, using optoelectronic traditional-watermark detection technologies known in the art.

As also noted, digital watermarks can be realized as part of optical holograms. Known techniques for producing and securely mounting holograms are disclosed in U.S. Pat. Nos. 5,319,475, 5,694,229, 5,492,370, 5,483,363, 5,658,411 and 5,310,222. To watermark a hologram, the watermark can be represented in the image or data model from which the holographic diffraction grating is produced. In one embodiment, the hologram is produced as before, and displays an object or symbol. The watermark markings appear in the background of the image so that they can be detected from all viewing angles. In this context, it is not critical that the watermark representation be essentially imperceptible to the viewer. If desired, a fairly visible noise-like pattern can be used without impairing the use to which the hologram is put.

Digital watermarks can also be employed in conjunction with labels and tags. In addition to conventional label/tag printing processes, other techniques—tailored to security—can also be employed. Known techniques useful in producing security labels/tags are disclosed in U.S. Pat. Nos. 5,665,194, 5,732,979, 5,651,615, and 4,268,983. The imperceptibility of watermarked data, and the ease of machine decoding, are some of the benefits associated with watermarked tags/labels. Additionally, the cost is far less than many related technologies (e.g. holograms). Watermarks in this application can be used to authenticate the originality of a product label, either to the merchant or to the consumer of the associated product, using a simple scanner device, thereby reducing the rate of counterfeit product sales.

Recent advances in color printing technology have greatly increased the level of casual counterfeiting. High quality scanners are now readily available to many computer users, with 300 dpi scanners available for under $100, and 600 dpi scanners available for marginally more. Similarly, photographic quality color ink-jet printers are commonly available from Hewlett-Packard Co., Epson, etc. for under $300.

Watermarks in banknotes and other security documents (passports, stock certificates, checks, etc.—all collectively referred to as banknotes herein) offer great promise to reduce such counterfeiting, as discussed more fully below. Additionally, watermarks provide a high-confidence technique for banknote authentication. One product enabled by this increased confidence is automatic teller machines that accept, as well as dispense, cash. The machine is provided with known optical scanning technology to produce digital data corresponding to the face(s) of the bill. This image set is then analyzed to extract the watermark data. In watermarking technologies that require knowledge of a code signal for decoding (e.g. noise modulation signal, crypto key, spreading signal, etc), a bill may be watermarked in accordance with several such codes. Some of these codes are public—permitting their reading by conventional machines. Others are private, and are reserved for use by government agencies and the like. (C.f. public and private codes in the present assignee's issued patents.)

Banknotes presently include certain markings which can be used as an aid in note authentication. Well known visible structures are added to banknotes to facilitate visual authentication and machine detection. An example is the seal of the issuing central bank. Others are geometrical markings. Desirably, a note is examined by an integrated detection system, for both such visible structures as well as the present watermark-embedded data, to determine authenticity.

The visible structures can be sensed using known pattern recognition techniques. Examples of such techniques are disclosed in U.S. Pat. Nos. 5,321,773, 5,390,259, 5,533,144, 5,539,841, 5,583,614, 5,633,952, 4,723,149 and 5,424,807 and laid-open foreign application EP 766,449. The embedded watermark data can be recovered using the scanning/analysis techniques disclosed in the cited patents and publications.

To reduce counterfeiting, it is desirable that document-reproducing technologies recognize banknotes and refuse to reproduce same. A photocopier, for example, can sense the presence of either a visible structure *or* embedded banknote watermark data, and disable copying if either is present. Scanners and printers can be equipped with a similar capability—analyzing the data scanned or to be printed for either of these banknote hallmarks. If either is detected, the software (or hardware) disables further operation.

The watermark detection criteria provides an important advantage not otherwise available. An original bill can be doctored (e.g. by white-out, scissors, or less crude techniques) to remove/obliterate the visible structures. Such a document can then be freely copied on either a visible structure-sensing photocopier or scanner/printer installation. The removed visible structure can then be added in via a second printing/photocopying operation. If the printer is not equipped with banknote-disabling capabilities, image-editing tools can be used to insert visible structures back into image data sets scanned from such doctored bills, and the complete bill freely printed. By additionally including embedded watermark data in the banknote, and sensing same, such ruses will not succeed.

(A similar ruse is to scan a banknote image on a non-banknote-sensing scanner. The resulting image set can then be edited by conventional image editing tools to remove/obliterate the visible structures. Such a data set can then be printed—even on a printer/photocopier that examines such data for the presence of visible structures. Again, the missing visible structures can be inserted by a subsequent printing/photocopying operation.)

Desirably, the visible structure detector and the watermark detector are integrated together as a single hardware and/or software tool. This arrangement provides various economies, e.g., in interfacing with the scanner, manipulating pixel data sets for pattern recognition and watermark extraction, electronically re-registering the image to facilitate pattern recognition/watermark extraction, issuing control signals (e.g. disabling) signals to the photocopier/scanner, etc.

A related principle is to insert an imperceptible watermark having a UID into all documents printed with a printer, scanned with a scanner, or reproduced by a photocopier. The UID is associated with the particular printer/photocopier/scanner in a registry database maintained by the products' manufacturers. The manufacturer can also enter in this database the name of the distributor to whom the product was initially shipped. Still further, the owner's name and address can be added to the database when the machine is registered for warranty service. While not preventing use of such machines in counterfeiting, the embedded UID facilitates identifying the machine that generated a counterfeit banknote. (This is an application in which a private watermark might best be used.)

While the foregoing applications disabled potential counterfeiting operations upon the detection of *either* a visible structure or watermarked data, in other applications, both criteria must be met before a banknote is recognized as genuine. Such applications typically involve the receipt or acceptance of banknotes, e.g. by ATMs as discussed above.

The foregoing principles (employing just watermark data, or in conjunction with visible indicia) can likewise be used to prevent counterfeiting of tags and labels (e.g. the fake labels and tags commonly used in pirating Levis brand jeans, Microsoft software, etc.)

The reader may first assume that banknote watermarking is effected by slight alterations to the ink color/density/distribution, etc. on the paper. This is one approach. Another is to watermark the underlying medium (whether paper, polymer, etc) with a watermark This can be done by changing the microtopology of the medium (a la mini-Braille) to manifest the watermark data. Another option is to employ a laminate on or within the banknote, where the laminate has the watermarking manifested thereon/therein. The laminate can be textured (as above), or its optical transmissivity can vary in accordance with a noise-like pattern that is the watermark, or a chemical property can similarly vary.

Another option is to print at least part of a watermark using photoluminescent ink. This allows, e.g., a merchant presented with a banknote, to quickly verify the presence of *some* watermark-like indicia in/on the bill even without resort to a scanner and computer analysis (e.g. by examining under a black light). Such photoluminescent ink can also print human-readable indicia on the bill, such as the denomination of a banknote. (Since ink-jet printers and other common mass-printing technologies employ cyan/magenta/yellow/black to form colors, they can produce only a limited spectrum of colors. Photoluminescent colors are outside their capabilities. Fluorescent colors—such as the yellow, pink and green dyes used in highlighting markers—can similarly be used and have the advantage of being visible without a black light.).

An improvement to existing encoding techniques is to add an iterative assessment of the robustness of the mark, with a corresponding adjustment in a re-watermarking operation. Especially when encoding multiple bit watermarks, the characteristics of the underlying content may result in some bits being more robustly (e.g. strongly) encoded than others. In an illustrative technique employing this improvement, a watermark is first embedded in an object. Next, a trial decoding operation is performed. A confidence measure (e.g. signal-to-noise ratio) associated with each bit detected in the decoding operation is then assessed. The bits that appear weakly encoded are identified, and corresponding changes are made to the watermarking parameters to bring up the relative strengths of these bits. The object is then watermarked anew, with the changed parameters. This process can be repeated, as needed, until all of the bits comprising the encoded data are approximately equally detectable from the encoded object, or meet some predetermined signal-to-noise ratio threshold.

The foregoing applications, and others, can generally benefit by multiple watermarks. For example, an object (physical or data) can be marked once in the spatial domain, and a second time in the spatial frequency domain. (It should be understood that any change in one domain has repercussions in the other. Here we reference the domain in which the change is directly effected)

Another option is to mark an object with watermarks of two different levels of robustness, or strength. The more robust watermark withstands various types of corruption, and is detectable in the object even after multiple generations of intervening distortion. The less robust watermark can be made frail enough to fail with the first distortion of the object. In a banknote, for example, the less robust watermark serves as an authentication mark. Any scanning and reprinting operation will cause it to become unreadable. Both the robust and the frail watermarks should be present in an authentic banknote; only the former watermark will be present in a counterfeit.

Still another form of multiple-watermarking is with content that is compressed. The content can be watermarked once (or more) in an uncompressed state. Then, after compression, a further watermark (or watermarks) can be applied.

Still another advantage from multiple watermarks is protection against sleuthing. If one of the watermarks is found and cracked, the other watermark(s) will still be present and serve to identify the object.

The foregoing discussion has addressed various technological fixes to many different problems. Exemplary solutions have been detailed above. Others will be apparent to the artisan by applying common knowledge to extrapolate from the solutions provided above.

For example, the technology and solutions disclosed herein have made use of elements and techniques known from the cited references. Other elements and techniques from the cited references can similarly be combined to yield further implementations within the scope of the present invention. Thus, for example, holograms with watermark data can be employed in banknotes, single-bit watermarking can commonly be substituted for multi-bit watermarking, technology described as using imperceptible watermarks can alternatively be practiced using visible watermarks (glyphs, etc), techniques described as applied to images can likewise be applied to video and audio, local scaling of watermark energy can be provided to enhance watermark signal-to-noise ratio without increasing human perceptibility, various filtering operations can be employed to serve the functions explained in the prior art, watermarks can include subliminal graticules to aid in image re-registration, encoding may proceed at the granularity of a single pixel (or DCT coefficient), or may similarly treat adjoining groups of pixels (or DCT coefficients), the encoding can be optimized to withstand expected forms of content corruption. Etc., etc., etc. Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art.

I claim:

1. A method utilizing steganographic embedding comprising:
    associating usage fights with media, wherein the usage rights are to be used by a rights management system to control how the media is handled by the system;
    in response to said associating, automatically providing an identifier; and
    embedding—through utilizing a processor or electronic processing circuitry—the identifier in the media in a steganographic manner, said act of embedding alters at least some data representing the media to carry the identifier.

2. The method of claim 1 wherein said associating usage rights with media comprises granting a user usage rights.

3. The method of claim 2 wherein granting a user usage rights follows a purchase of the media.

4. The method of claim 1 wherein said providing a steganographic identifier comprises receiving an identifier.

5. The method of claim 1 further comprising associating the identifier with the media in a remote data repository.

6. The method of claim 1 further comprising controlling the media with reference to at least the embedded identifier.

7. The method of claim 1 wherein in addition to embedding the identifier, additional information is steganographically embedded in the media.

8. The method of claim 7 wherein the other information comprises at least a time or manner of accessing the media.

9. The method of claim 1 wherein said embedding the identifier in the media in a steganographic manner involves digital watermarking.

10. A computer readable medium comprising instructions or circuitry to perform the method of claim 1.

11. The method of claim 1 wherein the media comprises video or audio.

12. A method comprising:
    associating usage rights with media, wherein the usage rights are to be used by a rights management system to control how the media is handled by the system;
    in response to said associating, automatically providing an identifier; and
    hiding the identifier in the media in a steganographic manner, said act of hiding utilizes a processor or electronic processing circuitry, and said act of hiding alters at least some data representing the media to carry the identifier.

13. The method of claim 12 wherein said act of hiding utilizes digital watermarking.

14. The method of claim 13 wherein the digital watermarking alters values associated with the media to hide the identifier therein.

15. A computer readable medium comprising instructions or circuitry to perform the method of claim 12.

16. The method of claim 12 wherein the media comprises video or audio.

17. A method comprising:
querying a rights management system to register media therein,
designating desired usage rights for the media, wherein the usage rights are to be used by a rights management system to control how the media is handled by the system;
in response to said designating, receiving without requiring user or operator input a plural-bit identifier; and
hiding—through utilizing a processor or electronic processing circuitry—the plural-bit identifier in the media in a steganographic manner.

18. The method of claim 17 wherein said act of hiding utilizes digital watermarking.

19. The method of claim 18 wherein the digital watermarking alters values associated with the media to hide the identifier therein.

20. A computer readable medium comprising instructions or circuitry to perform the method of claim 17.

21. The method of claim 17 wherein the media comprises video or audio.

* * * * *